3,260,752
PROCESS FOR THE PREPARATION OF DI-
AMINES FROM OLEFINICALLY UNSATU-
RATED NITRILES
Arthur F. Miller, Lyndhurst, and Milena Salehar and John
Williams, Cleveland, Ohio, assignors to The Standard
Oil Company, Cleveland, Ohio, a corporation of Ohio
No Drawing. Filed Jan. 28, 1963, Ser. No. 254,434
7 Claims. (Cl. 260—583)

The present invention relates to an improved method for preparing primary diamines from olefinically unsaturated nitriles and more particularly pertains to an improvement in the reaction of an olefinically unsaturated nitrile, ammonia, hydrogen and water comprising the inclusion of a high boiling, water-miscible solvent in place of part of the water.

The present invention is an improvement in the process disclosed and claimed in the copending U.S. patent application of A. F. Miller and W. B. Howsman, Serial No. 192,044, filed May 3, 1962, now Patent No. 3,166,596. The said copending patent application discloses a process for the simultaneous manufacture of trimethylene diamine and n-propylamine by reacting under relatively mild conditions a mixture comprising acrylonitrile, hydrogen and aqueous ammonia in the presence of a hydrogenation catalyst. The presence of water in this reaction has been shown to be essential to aid in the dispersion of catalyst and to extend catalyst life. Up to about 10 moles of water per mole of ammonia can be employed. Because water has a lower boiling point than the diamine products, large quantities of water must be taken overhead in order to recover the product.

It has now been found that by replacing a major portion of the water required in the copending process with a high boiling, inert solvent, the diamine products can be readily distilled from the reaction mixture without first removing large volumes of water. Unexpectedly, it has also been found that the presence of the high boiling, inert solvent enhances the selective reaction so that substantially all of the nitrile is converted to a primary diamine. A higher conversion of acrylonitrile to trimethylene diamine was obtained upon using a blend of water and a high boiling solvent than when either the water or the solvent was used alone. A further advantage in the use of a high boiling solvent is associated with the recovery step. The catalysts employed in this process are pyrophoric in nature and in the recovery, the catalyst is protected from air by the solvent mixture.

The water-miscible, inert solvent of this invention must be high boiling, having a boiling point higher than those of the diamine products. Preferred as high boiling solvents in the instant invention are compounds having the formula R—O—R'—O—R" wherein R represents hydrogen and a lower alkyl group having from one to four carbon atoms, R' represents an alkylene group having from two to four carbon atoms and R" represents hydrogen, an alkyl group having from one to four carbon atoms and a monohydroxy alkyl group having from two to four carbon atoms. Particularly suitable for this purpose are the alkylene glycols such as ethylene glycol, propylene glycol, trimethylene glycol, tetramethylene glycol, and the like, glycol ethers such as diethylene glycol, dipropylene glycol, dibutylene glycol, and the like, the monoalkyl ethers of glycols or glycol ethers such as ethylene glycol monobutyl ether, dipropylene glycol monoethyl ether, and the like. Also operable but less preferred are the polyols having more than two hydroxyl groups such as glycerol. The water-miscible, inert solvents can be used to replace from about 50% up to about 95% of the water normally present in the reaction. It is essential, however, that some water, at least 5% of that normally used in the process disclosed in the aforementioned U.S. patent application, be present in the instant process. The amount of water used must be carefully controlled. The lower limit is critical only in that at least a small amount must be present to prevent substantial loss of the activity of the hydrogenation catalyst. The upper limit of water present in the reaction must be controlled so as not to preclude the production of the diamine. In any event, the amount of water present in the reaction mixture should not exceed 10 moles of water per mole of ammonia.

The hydrogenation catalysts useful in the present process may be selected from the metals of Groups II to VIII of the Periodic Table or their compounds. Catalysts based on nickel and cobalt have been found to be particularly useful as, for example, Raney nickel, Raney cobalt, aluminum alloys, Raney nickel alloys, Raney nickel-chromium-aluminum alloys and cobalt-copper powder.

In general, high ratios of catalyst to acrylonitrile used result in the increased amount of trimethylene diamine produced. It appears that the optimum results from the standpoint of the production of a maximum amount of trimethylene diamine are obtained when the weight ratio of catalyst to acrylonitrile is from about 0.05 to 1.5.

The process may be carried out at a reaction temperature in the range of 50 to 350° C., and preferably between 75 and 155° C. The pressure within the reactor should be in the range of 15 to 200 atmospheres, and preferably in the range of 25 to 50 atmospheres. In order to insure that the reaction will go to completion, reaction times on the order of about one to five hours should be employed.

In general, the molar ratio of ammonia to acrylonitrile should be in the range of 5:1 to about 40:1, and a preferred ratio for the production of trimethylene diamine appears to be about 20:1. Ratios near the upper end of the range favor the production of trimethylene diamine at the expense of n-propylamine.

The process of this invention is illustrated further in the following example.

*Example*

Experimental work was conducted primarily in a one-liter Parr pressure reaction apparatus by adding the reactants and then raising the reaction temperature to the desired level (120–135° C.). The solid catalyst (Raney nickel) was brought into contact with the reactants by agitation with the propeller-type stirring blades. At the end of the reaction period, the temperature was lowered quickly by quenching the reactor in ice and the liquid mixture was analyzed for trimethylene diamine (TMD), n-propylamine (NPA), propionitrile and beta-amino propionitrile by vapor chromatography. The product was recovered by stripping to remove small amounts of water and ammonia followed by distillation of the amines from the solvent mixture.

The results of several experiments appear in the table below. The data illustrate the improved yield obtained with the replacement of 83% of the water in the reaction mixture with the solvent, dipropylene glycol. The data show that the yield of trimethylene diamine obtained with the partial replacement of water by dipropylene glycol is greater than that obtained with either component by itself. Where all the water was replaced with dipropylene glycol, no trimethylene diamine or n-propylamine was obtained, thus demonstrating that some water must be present in the reaction mixture for production of the desired amine product.

TABLE

| Vol. Percent Water Replaced by Solvent | Solvent | Molar Ratios, Reactants | | | Time, Hrs. | Percent Conversion | |
|---|---|---|---|---|---|---|---|
| | | $H_2O/NH_3$ | Catalyst/ Acrylonitrile | $NH_3$/ Acrylonitrile | | TMD | NPA |
| 0 | | 2.31 | 0.10 | 20.4 | 3 | 66.0 | 1.5 |
| 60 | Dipropylene Glycol | 1.42 | 0.10 | 20.8 | 3 | 75.6 | 2.9 |
| 83 | do | 0.4 | 0.10 | 22.2 | 3 | 78.5 | 3.2 |
| 95 | do | 0.153 | 0.10 | 24.0 | 3 | 78.3 | |
| 100 | do | 0 | 0.10 | 25.8 | 3 | 0 | 0 |
| 75 | Ethylene Glycol | 0.61 | 0.10 | 30.3 | 3 | 76.2 | 7.7 |
| 100 | do | 0 | 0.32 | 18.1 | 1 | 14.8 | 5.1 |

Similar results were obtained when the monobutyl ether of ethylene glycol or the monomethyl ether of diethylene glycol was substituted for dipropylene glycol in the foregoing experiments.

We claim:

1. In the process for production of trimethylene diamine by the reaction of a mixture of acrylonitrile, ammonia and hydrogen in the presence of a hydrogenation catalyst and water wherein the molar ratio of ammonia to acrylonitrile is from 5:1 to 40:1 and the molar ratio of water to ammonia is up to 10:1 the improvement comprising conducting the reaction at a temperature in the range of 50 to 350° C. and at a pressure in the range of 15 to 200 atmospheres and replacing a major proportion and up to about 95% of the water with a high boiling solvent having the formula

R—O—R′—O—R″ wherein R is a member selected from the group consisting of hydrogen and an alkyl group having from one to four carbon atoms, R′ is an alkylene group having from two to four carbon atoms and R″ is a member selected from the group consisting of hydrogen, an alkyl group having from one to four carbon atoms and a monohydroxy alkyl group having from two to four carbon atoms.

2. The process of claim 1 wherein the reaction temperature is in the range of 75 to 155° C. and the reaction pressure is in the range of from 25 to 50 atmospheres.

3. The process of claim 2 wherein the hydrogenation catalyst is Raney nickel.

4. The process of claim 3 wherein the high boiling solvent is ethylene glycol.

5. The process of claim 3 wherein the high boiling solvent is dipropylene glycol.

6. The process of claim 3 wherein the high boiling solvent is the monobutyl ether of ethylene glycol.

7. The process of claim 4 wherein the high boiling solvent is the monomethyl ether of diethylene glycol.

References Cited by the Examiner

UNITED STATES PATENTS 1,992,615　2/1935　Hoffmann et al.

FOREIGN PATENTS 824,535　12/1959　Great Britain.

CHARLES B. PARKER, *Primary Examiner.*

ANTON H. SUTTO, *Assistant Examiner.*